UNITED STATES PATENT OFFICE.

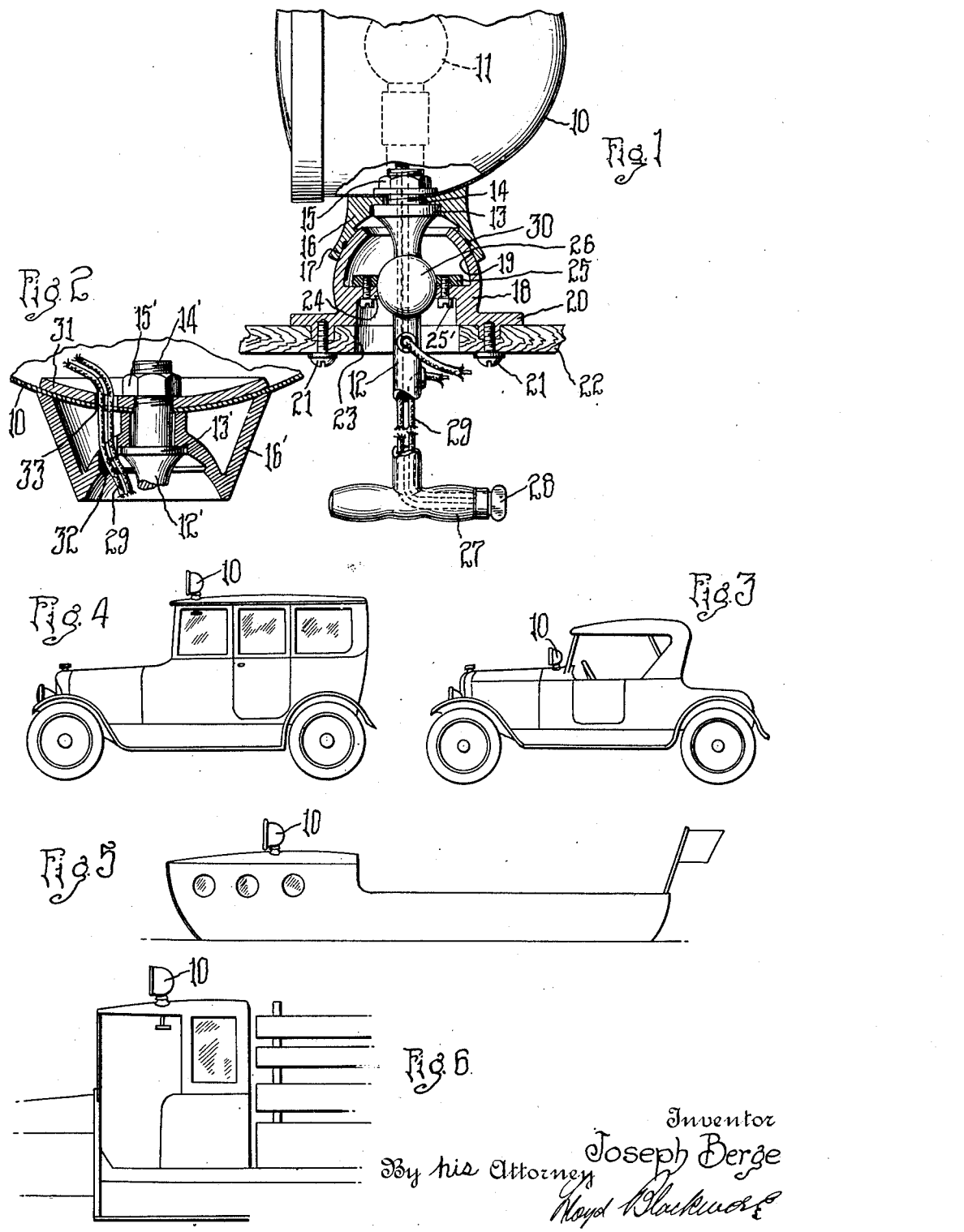

JOSEPH BERGE, OF FLINT, MICHIGAN.

LAMP SUPPORT.

1,420,075.  Specification of Letters Patent.  Patented June 20, 1922.

Application filed May 20, 1920. Serial No. 382,829.

*To all whom it may concern:*

Be it known that I, JOSEPH BERGE, a citizen of the United States, and a resident of Flint, county of Genesse, and State of Michigan, have invented certain new and useful Improvements in Lamp Supports, of which the following is a full, clear, concise, and exact description, such as will enable others skilled in the art to which the invention relates to make and use the same, reference being made therein to the accompanying drawings, which form a part of this specification.

The invention relates to lamp supports, and while in some respects it will be understood to be of more general applicability, it is of especial utility in connection with the mounting of lamps upon the bodies of vehicles, such as passenger or other automobiles, motor boats and the like.

One object of my invention is to provide a lamp support adapted to be readily mounted upon the exterior of the vehicle having a closed body and adapted to be manipulated by a driver or passenger within the vehicle body to throw the light of the lamp in the desired direction.

A further object is to provide a lamp support so positioned upon a vehicle body that the light may be directed to either side or to any desired point on the roadway, and which support shall not be in a position to interfere with entry to or exit from the vehicle.

A further object is to provide a spot light or search light mounting which shall be symmetrically positioned with reference to the body of a vehicle, thereby improving the neatness of design, and furthermore, without obstructing the vision of the occupants, permitting the use of the lamp as a "trouble" lamp or for the illumination of the engine and associated mechanism.

A further object is to provide a universal lamp mounting permitting the light to be thrown in any direction in a horizontal plane or at a considerable inclination to the horizontal, the mounting being adapted to retain the lamp in the adjusted position.

A further object is to provide a lamp mounted upon the exterior of a vehicle body, cab, cabin, or the like, with means whereby the light may be turned on or off and the lamp may be set in any desired position of adjustment with great facility and with practically but a single movement on the part of the operator.

With the above and other objects in view as will appear more fully from the following description, my invention consists of the features of novelty herein described and set forth in the appended claims.

In the accompanying drawings:—

Figure 1 is an elevation, partly in vertical section, showing one embodiment of my invention.

Figure 2 is a vertical section through a slightly modified form.

Figure 3 is a view of a common form of automobile of the open top type, showing my invention as applied to the cowl.

Figure 4 is a view of an automobile of the closed body type, showing the lamp mounting associated with the upper portion of the body.

Figure 5 is a view of a conventional cabin cruiser having the lamp mounting on the cabin roof or deck, and—

Figure 6 shows a lamp mounted upon the roof of a motor truck cab.

The lamp structure comprised in my invention which may be employed especially as a head light or spot light in connection with vehicles, or in similar relationships, includes a casing or housing 10 which is preferably of the type adapted to throw a beam of light in one direction as by means of a reflector or lens. The light source may be of any desired character, an electric bulb 11 being shown as a convenient form. The lamp housing 10 is rigidly attached to a rod 12, the rod being provided adjacent to the outer end with a shoulder 13 and a screw-threaded portion 14 adapted to receive a nut 15. The housing is clamped between the nut and the shoulder, a cap or saddle member of inverted cup shape with a spherically formed inner surface 17 being also secured between the nut and the shoulder.

A supporting member or base 18, having a spherical portion 19 adapted to fit the spherical surface 17 is secured by the flange 20 and screws 21 to the wall 22 of the vehicle or the like with which the lamp is to be associated. The wall 22, which may be the top portion, either cowl, shroud, or roof, of the vehicle, is provided with an aperture 23 over and around which the base 18 is mounted, and the mounting is preferably such as to make the joint weather-proof so that dust or water will not penetrate within the body to which the lamp is applied.

Inside the base 18 is a socket member, shown in Figure 1 as comprising a diaphragm 24 having a spherical seat at its center and concentric with the spherical surface 19 of the base member. Blocks 25 may be secured to the diaphragm by adjusting screws 25' or the like, accessible, as illustrated, from the interior of the vehicle through the aperture 23, and in the seat thus formed is clamped a ball 26 formed upon or secured to the rod 12. The clamping devices comprising the nut 15 and the blocks 25 will be so adjusted as to hold the saddle 16 in frictional engagement with the base 18 so that the lamp will remain in any position to which it may have been turned.

The rod 12 is extended inwardly of the wall 22, passing through the aperture 23, to any convenient distance, depending upon the character and dimensions of the body part upon which the lamp is mounted, and will be provided at the inner end with a handle 27 which may be readily grasped by the driver or passenger. Where an electric lamp is employed as a source of light, I preferably locate a controlling device, as a button or switch 28, at a convenient place on the handle and arrange the conductors inside the rod which may be made hollow for that purpose. By means of this construction it will be seen that the light may be turned on and the lamp adjusted with one hand and with almost a single movement.

A groove 30 may be formed in the spherical surface of the saddle 16, in which fibrous material may be placed which will serve as dust excluding and lubricant retaining means.

In Figure 2 I have shown a slightly modified form of saddle, which may be pressed or forged if desired, and between which and the curved plate or washer 31 the lamp casing or housing 10 may be clamped. In this case the rod 12' is shown as being solid and the conductor 29 is passed through holes 32, 33, in order to reach the interior of the casing.

When the lamp mounting is associated with the cowl of an automobile it is intended that the handle 27 shall extend downwardly to the rear of the dash and adjacent to the instrument board, the lamp being located substantially upon the central plane of the vehicle as shown in Figure 3, and adapted to be manipulated by the driver or by a passenger in the front seat. When mounted upon the upper portion of a body, the structure will be preferably so positioned that the handle will be in a convenient location to be grasped by the driver or passenger without moving from the seat.

The lamp mounting herein described, when employed in connection with a vehicle and more particularly an automobile, has advantages over the commonly used spot light or search light clamped to some part of the vehicle body or top, as to the windshield frame. Lamps so attached to the vehicle are in such position as to obstruct the vision in certain directions, to hinder free entry to or exit from the vehicle, and to interfere with the attachment of the curtains or the opening or closing of doors. Furthermore, they present an unsightly and unbalanced appearance, both because of their position and means of attachment and because the wiring is necessarily unenclosed. They are difficult to mount upon the vehicle, especially in view of the wide variation in the character of the parts by which they must be supported, and are even more difficult to maintain fixedly in position owing to the tendency of the clamps to become loosened. Furthermore, the inaccessibility of the lamp from the interior of the body and especially from the normal position of the driver renders its adjustment difficult or at times wholly impracticable.

All of these disadvantages are entirely absent in the lamp mounting herein described. With my invention the lamp, while it may be easily mounted upon any car, is so positioned as to present a symmetrical appearance and conveys the impression of a permanent of "built-in" feature, rather than a mere attachment.

The lamp may be almost instantly adjusted, either by the driver or by a passenger, to direct the light toward the curb or either side of the road, or to any other point about the vehicle. Furthermore, by merely grasping the lamp housing, adjustment may be made with facility from the outside of the vehicle. The mounting is weathertight, and the operating mechanism and wiring are housed within the vehicle body. The supporting means is firmly fixed and the lamp cannot be readily detached or stolen.

When mounted upon the top or roof of a cab, cabin, or closed body, it will be possible to direct the beam of light upon a point at a considerable distance from the vehicle at a greater angle to the horizontal than is customary with the ordinary headlights, thus avoiding the blinding effect upon approaching drivers or others.

These and other advantages will, it is believed, be apparent to those who are accustomed to the use and operation of automobiles, motor boats and the like.

While I have shown the mounting associated with some form of vehicle, it will be evident that it may be employed in other relationships where its advantages may render it useful.

It will be understood that the specific details of construction may be varied without departing from the spirit and scope of the invention, and therefore I do not wish to be limited to the particular details described.

I claim:

1. In a lamp mounting for motor vehicles or the like the combination of a vehicle body having an outwardly exposed portion formed with an aperture, a support secured to said body around said aperture and provided with a curved socket, a lamp casing, a rod rigidly secured thereto and provided with a ball member spaced from the lamp casing and seated in said socket, said rod extending through said aperture and provided with a handle inside the vehicle body whereby the lamp casing may be adjusted from the interior of the vehicle, means for preventing passage of water or dust through the joint between the ball and socket, and means arranged to be accessible from the interior of the vehicle to clamp the said ball in the socket.

2. The combination of a vehicle body comprising a top portion having an aperture therein, a support mounted over said aperture in weather proof relation to said body and comprising a socket and an upwardly directed spherical portion concentric with said socket, a lamp housing having a saddle fitting over and in frictional engagement with the spherical portion of the support, and a rod rigidly attached to said housing and having a ball member seated in said socket, said rod extending inwardly through said aperture and provided with a handle operable from the interior of the vehicle, said parts being so adjusted as to retain the housing in adjusted positions by friction while permitting manipulation of said housing by means of said handle.

3. In a lamp mounting for motor vehicles or the like the combination of a vehicle body having an outwardly exposed portion formed with an aperture, a support secured to said body around said aperture and in weather proof relation thereto, said support comprising a curved socket, a lamp casing, a rod rigidly secured thereto and having a ball member spaced from the lamp casing seated in said socket, said rod extending inwardly through said aperture and having a handle accessible from the interior of the vehicle, and means adjustable from the interior of the vehicle for clamping said spherical member in said socket.

4. In a lamp mounting for motor vehicles or the like the combination of a vehicle body having an outwardly exposed portion formed with an aperture, a support secured to said body around said aperture, said support comprising a socket and a spherical surface surrounding said socket, a lamp casing, a rod rigidly secured thereto and having a ball member seated in said socket, said rod extending inwardly through said aperture and provided with a handle whereby the rod and lamp casing may be manipulated from the interior of the vehicle, a saddle carried by said casing and engaging said spherical surface, and clamping means housed within said support for drawing the ball member to its socket and the saddle against the spherical surface.

In testimony whereof I affix my signature.

JOSEPH BERGE.